(12) United States Patent
Lavigne et al.

(10) Patent No.: US 7,233,598 B2
(45) Date of Patent: Jun. 19, 2007

(54) SYSTEM AND METHOD FOR SPECULATIVELY ISSUING MEMORY REQUESTS WHILE MAINTAINING A SPECIFIED PACKET ORDER

(75) Inventors: Bruce E. Lavigne, Roseville, CA (US); Lewis S. Kootstra, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 966 days.

(21) Appl. No.: 10/091,775

(22) Filed: Mar. 5, 2002

(65) Prior Publication Data

US 2003/0169758 A1    Sep. 11, 2003

(51) Int. Cl.
  H04L 12/56    (2006.01)
  G06F 11/00    (2006.01)
  G06F 3/00     (2006.01)
(52) U.S. Cl. .................. 370/413; 370/236; 710/7; 710/20
(58) Field of Classification Search ........ 370/412, 370/413–415, 417
   See application file for complete search history.

(56) References Cited

U.S. PATENT DOCUMENTS

| | | | | |
|---|---|---|---|---|
| 5,432,908 A | * | 7/1995 | Heddes et al. | 711/147 |
| 5,752,269 A | * | 5/1998 | Divivier et al. | 711/169 |
| 5,787,488 A | * | 7/1998 | Garde | 711/169 |
| 5,812,799 A | * | 9/1998 | Zuravleff et al. | 710/52 |
| 5,875,466 A | * | 2/1999 | Wakerly | 711/138 |
| 6,295,592 B1 | * | 9/2001 | Jeddeloh | 711/169 |
| 6,718,400 B1 | * | 4/2004 | Tsai et al. | 710/5 |
| 6,728,843 B1 | * | 4/2004 | Pong et al. | 711/150 |
| 6,754,739 B1 | * | 6/2004 | Kessler et al. | 710/52 |
| 2003/0188088 A1 | * | 10/2003 | Kootstra | 711/105 |

* cited by examiner

Primary Examiner—Kwang Bin Yao
Assistant Examiner—Warner Wong
(74) Attorney, Agent, or Firm—Richard P. Lange

(57) ABSTRACT

The present invention is a system and method for forwarding packets in order. A first packet may be received for forwarding. Subsequently, a second packet may be received for forwarding. A first memory request corresponding to the first packet is sent. A second memory request corresponding to the second packet may be sent prior to receiving a first memory reply corresponding to the first memory request. The first packet is forwarded prior to forwarding the second packet. In this novel manner, bandwidth in a network apparatus may be utilized with greater efficiency while maintaining packet ordering.

7 Claims, 6 Drawing Sheets

SYSTEM AND METHOD FOR SPECULATIVELY ISSUING MEMORY REQUESTS WHILE MAINTAINING A SPECIFIED PACKET ORDER

TECHNICAL FIELD

Embodiments of the present invention relate to networking. More particularly, embodiments of the present invention relate to a system and method for speculatively issuing memory requests while maintaining a specified packet order.

BACKGROUND ART

The internet has revolutionized the movement of information for both commercial and personal business. Fantastic technical advances in the communications arts have fueled the tremendous growth of the internet and networking in general. The growth fueled by these advances has in turn become a catalyst for greater innovation.

One area receiving a great deal of attention is the routing, or switching of information among various networks, or different segments of a network. The devices which perform these operations are typically known as routers or switches.

A principal function of a router or a switch is to move information, usually in the form of packets, particularly Internet Protocol, or IP, packets, from one network, or segment of a network, to another. The different networks or segments may frequently be of different types of media, e.g., coaxial cable versus fiber optics, and may often be of differing data rates or capacity. Often, the different network segments go to different physical locations, for example, different parts of a building, or distinct geographical regions. Frequently, too, information destined for multiple networks or segments may be received from a single network or segment.

Consequently, sending data to the right network or segment, along with controlling the flow, e.g., not attempting to send more data to a network or segment that it can handle, are of critical importance in the function of a network router or switch.

Receiving packets into a queue, and sending them out when a receiving network or segment is capable of accommodating such packets is a well known method of controlling the flow.

In the prior art, it is well known to request an allocation or space in a receiving queue associated with a receiving network or segment. This request is commonly known as a memory or buffer request. When a buffer for a receiving network or segment is able to actually receive a packet, it typically sends a message to the sending function to indicate its readiness. This reply is known as a memory or buffer reply. In response to such a buffer reply, a sending function transfers a packet to a receiving function associated with an outbound network or segment of a network.

FIG. 1 illustrates a prior art sequence of processing a packet. Packets are received and temporarily stored in a queue 100. When a packet, for example packet 0 (110) reaches the head of queue 102, it is ready to be forwarded. After packet 0 (110) has been successfully forwarded, packet 1 (111) will move to the head of the queue, and so on.

The mechanism of queue 100 ensures that packets are forwarded in the order in which they are received. Many types of multi part messages, for example streaming audio, may be severely degraded if their original packet order is not maintained throughout transmission. Further, processing packets in order ensures the equitable allocation of fixed resources within a network device or among networks. For example, if a packet processing device forwarded a packet to any receiver that was ready, as opposed to forwarding packets in order, a high bandwidth receiver could effectively monopolize the resources of the forwarding packet processing device to the detriment of packets intended for other, slower receivers. Such packets could enter a detrimental state of suspension, even if the receiving network had available bandwidth. For these reasons and others, processing packets in order is considered a critical attribute for switches and routers.

Still referring to FIG. 1, when packet 0 (110) reaches the head of queue 102 position, a buffer request 0 (120) is generated and sent to a receiving buffer (not shown). The receiving buffer, in general, will be busy, for example receiving packets from other sources or sending packets out via an associated network interface. Consequently, there will typically be a period of latency 122 prior to the receiving buffer's readiness to receive a packet.

After period of latency 122, when it is ready, a receiving buffer will reply to buffer request 0 (120) with a buffer reply 0 (124) message, indicating that it is ready to receive packet 0 (110). Upon receiving buffer reply 0 (124), packet 0 (110) is sent to the receiving buffer.

After packet 0 (110) has been successfully sent to a receiving buffer, packet 1 (111) moves to the head of queue 100, and the process repeats. As shown in FIG. 1, buffer request 1 (130) is not sent until packet 0 (110) has completed being sent. There will typically be a latency period 132, which in general is a different amount of time that latency period 122, followed by a buffer reply 1 (134) and ultimately the sending of packet 1 (111), which is not shown.

Unfortunately, in the prior art, the sequence of sending a buffer request, waiting until a receiving buffer is ready, receiving a buffer reply, and sending the designated packet requires an undesirably long time to complete. A packet would not be sent until a corresponding buffer reply was received. A second cycle of sending a buffer request, receiving a buffer reply, and sending a designated packet would not be initiated until after a current request, reply and transfer cycle has successfully completed. This restriction has a desired effect of sending packets in proper order, but imposes a severe latency penalty. In the prior art, this latency period 122 is lost. The latency effectively reduces overall bandwidth within the router or switch, which in turn reduces the number of packets it may route or switch on external networks per unit time.

SUMMARY OF THE INVENTION

A method of speculatively issuing memory requests while maintaining a specified packet order is disclosed. A first packet is received for forwarding. Subsequently, a second packet is received for forwarding. A first memory request corresponding to the first packet is sent. A second memory request corresponding to the second packet is sent prior to receiving a first memory reply corresponding to the first memory request. The first packet is forwarded prior to forwarding said second packet.

BEST MODES FOR CARRYING OUT THE INVENTION

A system and method for speculatively issuing memory requests while maintaining a specified packet order are disclosed. A first packet is received for forwarding. Subsequently, a second packet is received for forwarding. A first buffer request corresponding to the first packet is sent. A second request corresponding to the second packet is sent prior to receiving a first reply corresponding to the first request. The first packet is forwarded prior to forwarding the second packet. In this novel manner, the inherent latency typically associated with a response/reply protocol can effectively be "masked" out. Thereby, the bandwidth in a network apparatus may be utilized with greater efficiency while maintaining packet ordering.

As a beneficial result, network routers or switches utilizing embodiments of the present invention have the enhanced ability to process greater numbers of packets in a given time, improving overall network throughput, as measured both in packets per second as well as in elapsed switching time per packet. Further, embodiments of the present invention may be practiced with little or no additional hardware cost over the prior art, consequently reducing the cost per packet of such networking devices.

Figure 2:
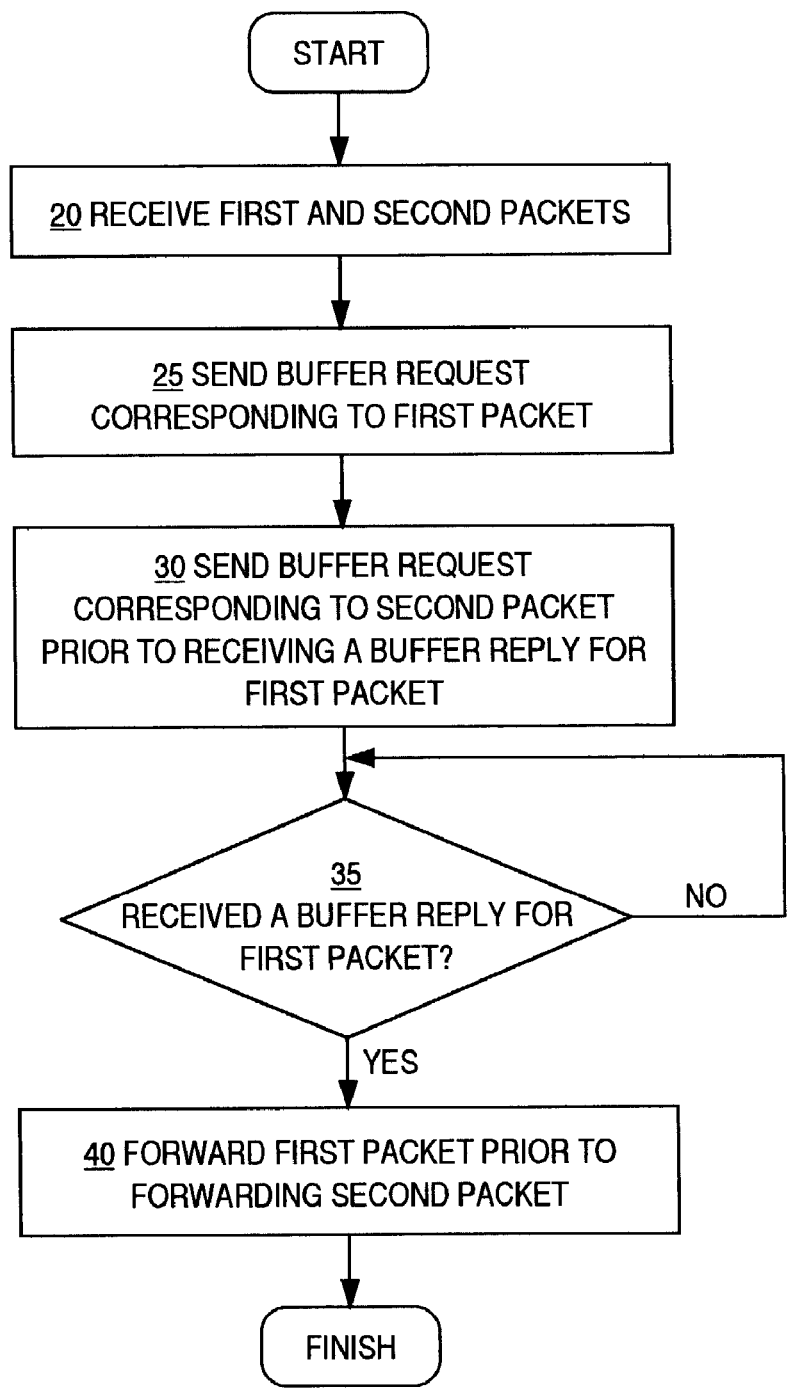
FIG. 2 shows a flow chart of a method of forwarding packet in order, according to an embodiment of the present invention.

FIG. 2 shows a flow chart of a method 10 of forwarding packets in order, according to an embodiment of the present invention. In step 20, a first and second packets are received in sequence. In step 25, a memory or buffer request corresponding to the first packet is sent. A memory or buffer request solicits an allocation or space in a receiving queue, associated with a receiving network or segment. In step 30, a memory or buffer request corresponding to the second packet is sent, for example to packet processor 340 of FIG. 4. This memory or buffer request is sent prior to receiving a memory or buffer reply corresponding to the memory or buffer request sent in step 25. In optional step 35, the process may wait until a memory or buffer reply corresponding to the first packet is received before continuing. If such a memory or buffer reply is received, processing continues at step 40.

In step 40, the first packet is forwarded prior to forwarding the second packet. A memory or buffer request for the second packet has already been sent (step 30). According to an embodiment of the present invention, a memory or buffer reply may be received prior to step 40. It is possible that a buffer reply corresponding to the second packet was received prior to a buffer reply corresponding to the first packet. However, packets are still forwarded in the order received.

Figure 3:
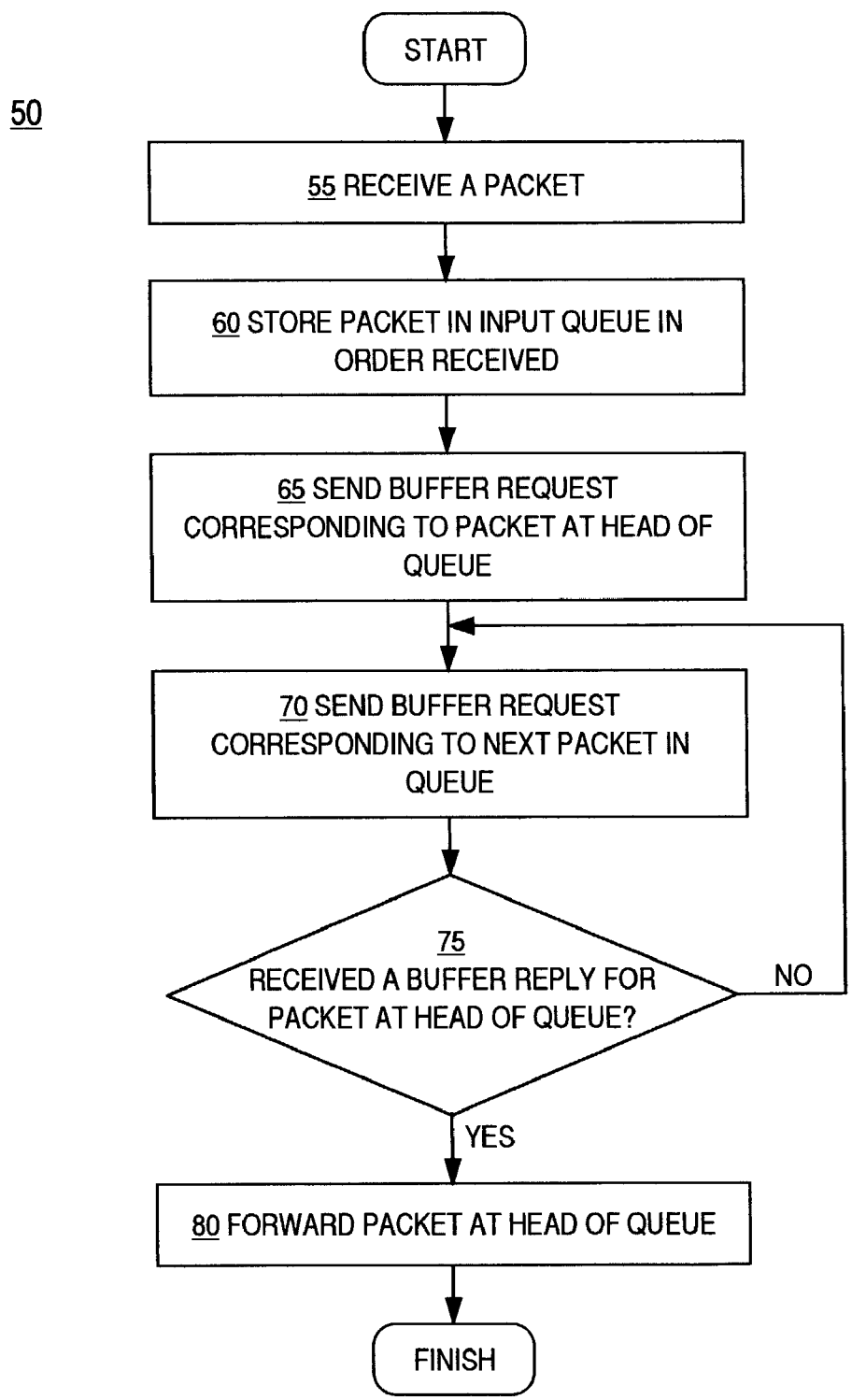
FIG. 3 illustrates a flow chart for a method of advancing a resource request, according to an embodiment of the present invention.

FIG. 3 illustrates a flow chart for a method 50 of advancing a resource request, according to an embodiment of the present invention. In optional step 55, a packet may be received. In step 60, the received packet may be stored in an input queue in the order in which packets are received. In optional step 65, a buffer request corresponding to a packet at the head of the input queue may be sent. In step 70, a buffer request corresponding to the next packet in the queue may be sent. It is to be appreciated that at various times the next packet in the queue may or may not be the second packet in the queue. For example it may be the fifth packet in queue.

In optional step 75, the process checks for the receipt of a buffer reply corresponding to the packet at the head of the queue, for example from packet processor 340, which indicates that the receiving packet processor is ready to accept that particular packet. If the appropriate buffer reply has not been received, process flow transfers to step 70, and an additional buffer request, corresponding to the next packet in queue for which a buffer request has not been sent, is sent. If a buffer reply corresponding to the packet at the head of the queue has been received, process flow continues at optional step 80 and the packet is sent, for example, to packet processor 340.

Figure 4:
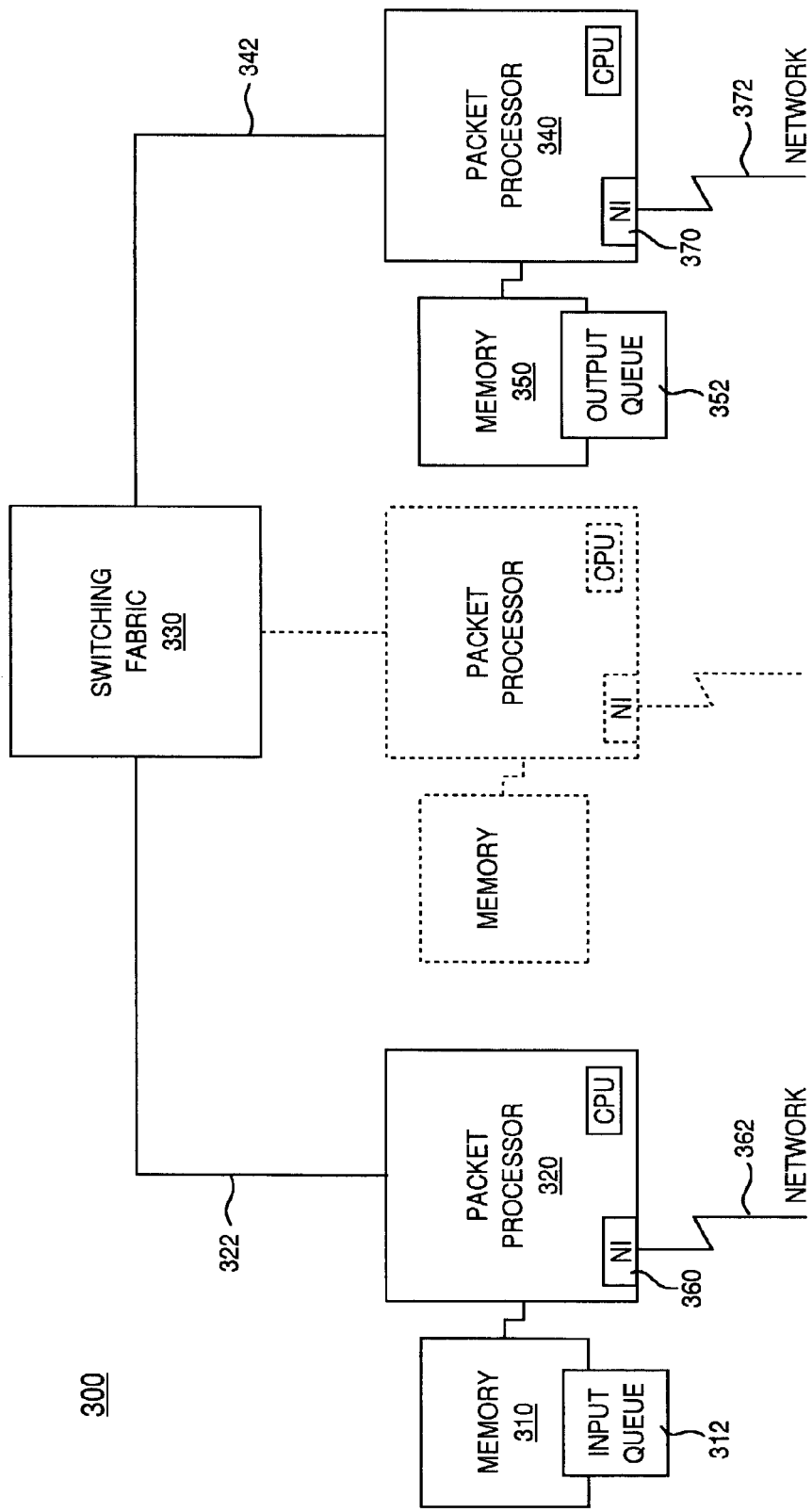
FIG. 4 shows a block diagram of elements of an exemplary network switch upon which embodiments of the present invention may be practiced, according to an embodiment of the present invention.

FIG. 4 shows a block diagram of elements of an exemplary network switch 300 upon which embodiments of the present invention may be practiced. At a high level, network switch 300 comprises at least two packet processors, for example packet processors 320 and 340, and a switching fabric, e.g., switching fabric 330, which allows packet processors to communicate with each other. Switch 300 typically includes many more similar packet processors.

Packet processor 320 contains network interface 360, which provides a physical interface to a communications link 362. Communications link 362 is a network, or segment of a network, comprising, for example, FDDI, fiber optic token ring, T1, Bluetooth, 802.11, ethernet etc. Network 362 may be a portion of a LAN, MAN, WAN or other networking arrangement.

Packet processor 320 includes an associated memory 310 for storing many types of information, including packets received from, or to be transmitted on network 362. It is to be appreciated that memory 310 may be internal or external to packet processor 320. Packet processor 320 is shown as having an input queue 312 for storing packets received from network 362. It is to be appreciated that packet processor 320 may also be configured to transmit packets onto network 362.

Packet processor 320 may have a local connection 322 to connecting fabric 330. In this example, connecting fabric 330 is depicted as connecting packet processor 320, via local connection 322, with packet processor 340, via local connection 342. It is appreciated that switching fabric 330 may also interconnect with other packet processors. Packet processors, e.g. 320 and 340, will generally contain a CPU or micro controller to control their operation.

Packet processor 340 may have a function and implementation analogous to those described for packet processor 320, including memory 350 and communications interface 370. Packet processor 340 is shown as having an output queue 352 for storing packets to be sent out on network 372.

Communications link 372 may be a network comprising, for example, FDDI, fiber optic token ring, T1, Bluetooth, 802.11, ethernet etc. Communications link 362 may be a portion of a LAN, MAN, WAN or other networking arrangement. In general, communications link 372 will not be the same network segment as communications link 362. Typically, although it is not a requirement, communications link 362 and communications link 372 may be different types of networks operating at different speeds.

Packet processors 320 and 340 may both be receiving and sending packets at a high rate of speed. In addition, a more general configuration of switch 300 may have many packet processors, and in general may receive and send packets on many combinations of these many packet processors.

In order to more clearly describe embodiments of the present invention, one path through exemplary switch 300, that of information received from network 362 to be sent out on network 372, will be further described below. It is to be appreciated that packets may be received from any network and switched to any other network.

Figure 5:
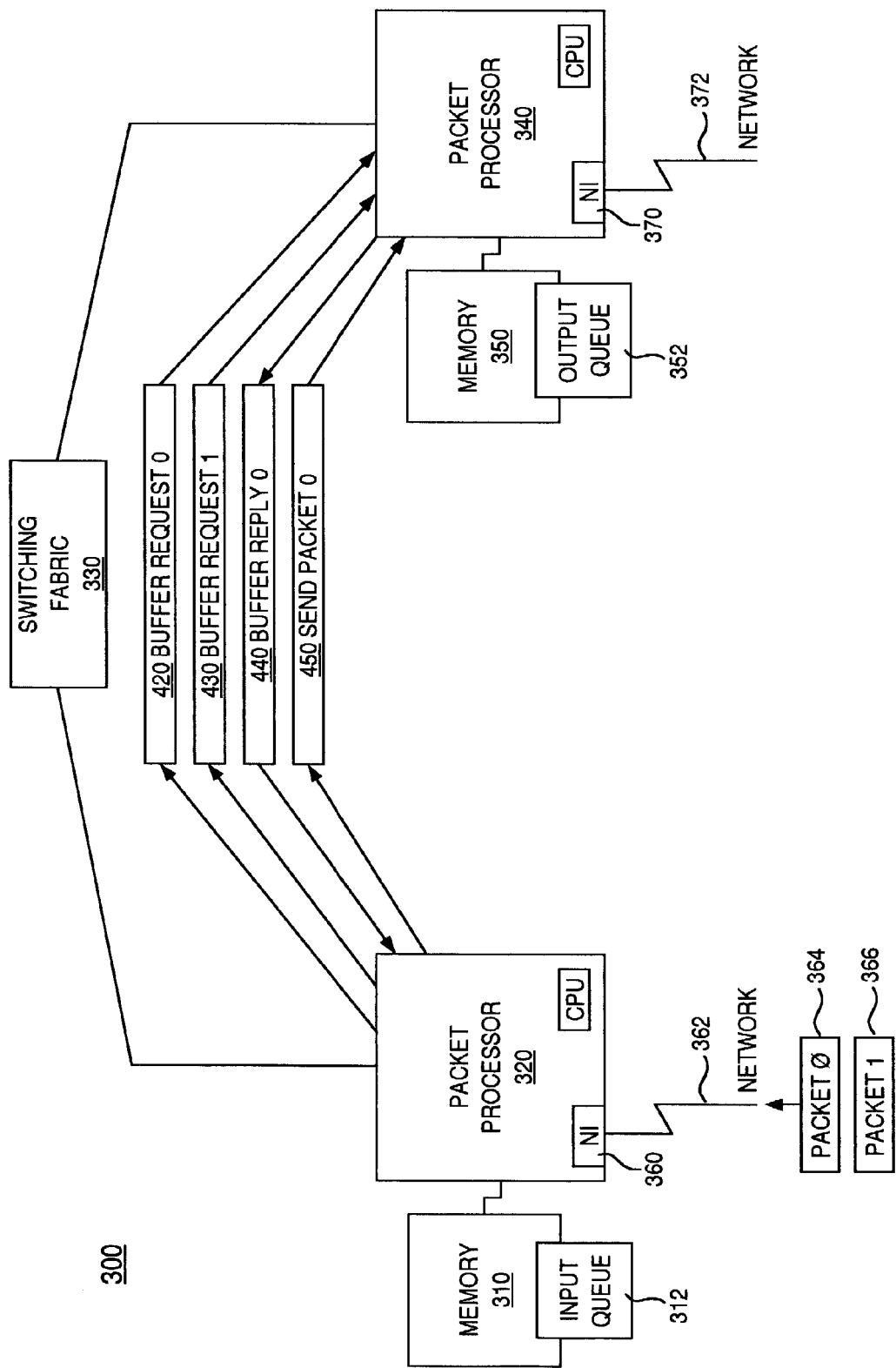
FIG. 5 illustrates an exemplary communications flow through a switch, according to an embodiment of the present invention.

FIG. 5 illustrates an exemplary communications flow through switch 300, according to an embodiment of the present invention. Packet processor 320 receives multiple packets, for example packet 0 (364) and packet 1 (366) from network 362 to be switched or routed to network 372 via packet processor 340. Interleaved with those packets however, there are typically other packets intended for other communication links.

Packet processor 320 receives packet 0 (364) and packet 1 (366) and places them into input queue 312 in the order received. The mechanism of queue 312 ensures that packets are forwarded in the order in which they are received. Many types of multi part messages, for example streaming audio, may be severely degraded if their original packet order is not maintained throughout transmission. Further, processing packets in order ensures the equitable allocation of fixed resources within a network device or among networks. For example, if a packet processing device forwarded a packet to any receiver that was ready, as opposed to forwarding packets in order, a high bandwidth receiver could effectively monopolize the resources of the packet processing device to the detriment of packets intended for other, slower receivers. Such packets could enter a detrimental state of suspension, even if the receiving network had available bandwidth. For these reasons and others, processing packets in order is considered a critical attribute for switches and routers.

When packet 0 (364) has reached the head of queue 312, packet processor 320 generates and sends a buffer request message 420 for packet 0 to packet processor 340. Packet processor 340 may not be able to immediately accept packet 0 (364). For example, it may be busy processing other packets, or output queue 352 may be full. Consequently, in general there will be a delay or latency before packet processor 340 is able to receive packet 0 (364).

According to an embodiment of the present invention, packet processor 320 may be able to take advantage of this period of latency and send a buffer request 430 for packet 1 (366). It is to be appreciated that packet processor 320 may contain additional packets for forwarding to packet processor 340 or other packet processors (not shown), and packet processor 320 may send buffer requests corresponding to these packets during a period of latency as well.

When packet processor 340 is ready to accept packet 0 (364), it will send a buffer reply message 440. Upon receipt of buffer reply message 440, packet processor 320 will send 450 packet 0 (364) to packet processor 340. Packet processor 340 will typically place packet 0 (364) into output queue 352 prior to sending it out on network 372.

In addition, buffer request and/or buffer reply messages may be sent in a batch mode, (e.g., several at a time).

Figure 6:
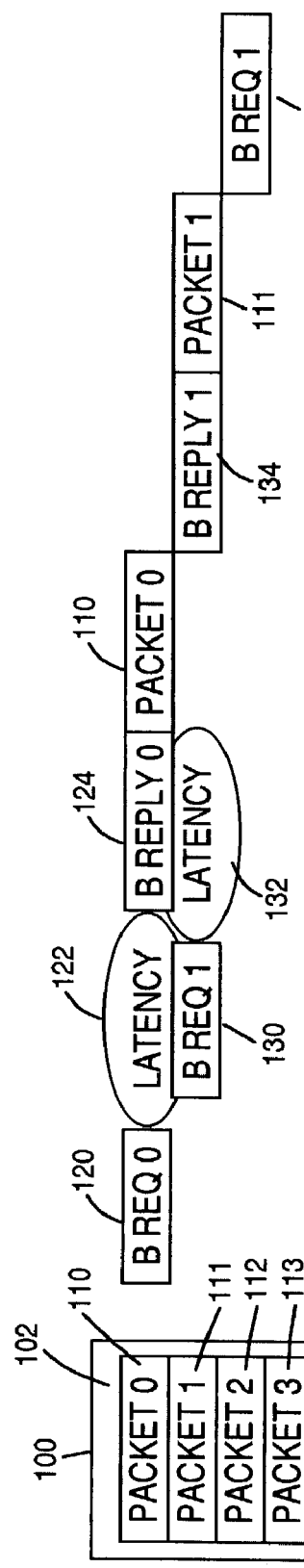
FIG. 6 illustrates a sequence of operations of processing a packet, according to an embodiment of the present invention.

FIG. 6 illustrates a sequence of processing a packet, according to an embodiment of the present invention. Packets are received and temporarily stored in a queue 100, for example input queue 312 of FIG. 4. When a packet, for example packet 0 (110) reaches the head of queue 102, it is ready to be forwarded. After packet 0 (110) has been successfully forwarded, packet 1 (111) will move to the head of the queue, and so on.

The mechanism of queue 100 ensures that packets are forwarded in the order in which they are received. Many types of multi part messages, for example streaming audio, may be severely degraded if their original packet order is not maintained throughout transmission. Further, processing packets in order ensures the equitable allocation of fixed resources within a network device or among networks. For example, if a packet processing device forwarded a packet to any receiver that was ready, as opposed to forwarding packets in order, a high bandwidth receiver could effectively monopolize the resources of the packet processing device to the detriment of packets intended for other, slower receivers. Such packets could enter a detrimental state of suspension, even if the receiving network had available bandwidth. For these reasons and others, processing packets in order is considered a critical attribute for switches and routers.

When packet 0 (110) reaches the head of queue 102 position, a buffer request 0 (120) is generated and sent to a receiving buffer (not shown). The receiving buffer will typical be busy receiving packets from other sources or sending packets out via an associated network interface. Consequently, there will typically be a period of latency 122 prior to the receiving buffer's readiness to receive a packet. An embodiment of the present invention is able to utilize period of latency 122 by sending buffer request 1 (130), corresponding to packet 1 (111).

When a receiving buffer is ready to receive packet 0 (110), it will reply to buffer request 0 (120) with a buffer reply 0 (124), indicating that it is ready to receive packet 0 (110). Upon receiving buffer reply 0 (124), packet 0 (110) is sent to the receiving buffer. After packet 0 (110) has been successfully sent to a receiving buffer, packet 1 (111) moves to the head of queue 100.

Much or all of a latency period for buffer request 1 (130) may have expired while buffer reply 0 (124) and packet 0 (110) were being sent. This is particularly the case if packet 1 (111) is destined for a different receiving buffer than packet 0 (110).

As shown in FIG. 6, a buffer reply 134 for packet 1 may be received soon after packet 0 (110) is sent. Thereafter, packet 1 (111) may be sent.

Figure 1:
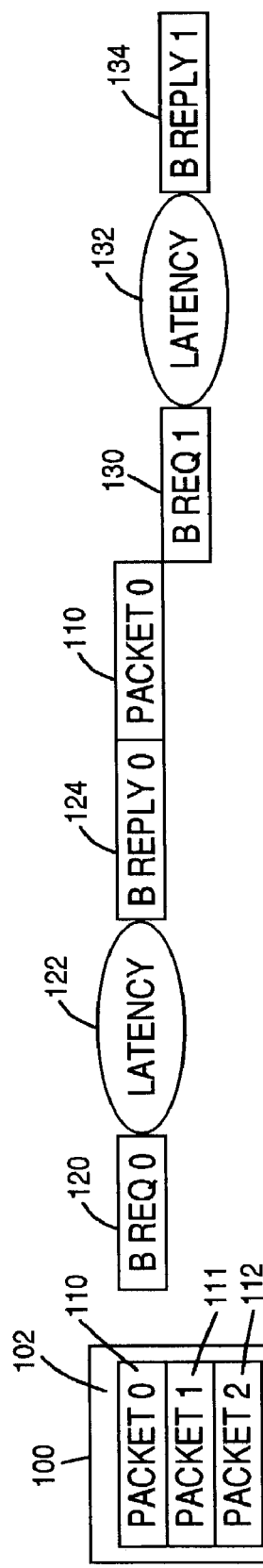
FIG. 1 shows a prior art sequence of processing a packet.

In contrast with the prior art sequence shown in FIG. 1, several additional tasks, including sending packet 1 (111) are accomplished in this embodiment of the present invention in the same amount of time, which is indicative of the bandwidth advantages of embodiments of the present invention. In this manner, the time spent waiting for a buffer reply and the time spent waiting for a packet to move to the head of a transfer order queue may be utilized more efficiently, resulting in improved throughput for a network apparatus.

What is claimed is:

1. A networking device comprising:
   a first packet processor comprising:
      an input interface having a port to accept incoming packets;
      an input memory coupled to said input interface for temporarily storing said packets in a queue arranged by a receiving order;
   a second packet processor comprising:
      an output interface having a port to send said packets out of said networking device;

an output memory coupled to said output interface for temporarily storing said packets;

a switching fabric coupled to said first packet processor and said second packet processor for conveying information between said first packet processor and said second packet processor; and said first packet processor also for sending a memory request corresponding to a first packet which is not at a head of said queue to said second packet processor, said first packet processor also for receiving a memory reply from said second packet processor corresponding to said memory request for said first packet prior to forwarding a second packet that is ahead of said first packet in said queue.

2. The networking device as described in claim 1 wherein said first packet processor is also for sending a third packet to said second packet processor, wherein said third packet is at the head of said queue.

3. The networking device as described in claim 2 wherein said second packet processor is also for receiving said first packet, said second packet and said third packet.

4. The networking device as described in claim 1 wherein said second packet processor is also for sending said first packet out of said networking device.

5. The networking device as described in claim 1 further comprising a plurality of packet processors in addition to said first and said second packet processors coupled to said switching fabric.

6. The networking device as described in claim 1 wherein said memory request comprises a first portion to indicate that said first packet is not at a head of said queue.

7. The networking device as described in claim 1 wherein said first packet is an internet protocol packet.

* * * * *